United States Patent [19]
Biliris et al.

[11] Patent Number: 6,047,272
[45] Date of Patent: Apr. 4, 2000

[54] SENDER-PAID ELECTRONIC MESSAGING

[75] Inventors: Alexandros Biliris, Chatham; Gisli Hjalmtysson, Gillette; Hosagrahar Visvesvaraya Jagadish, Berkeley Heights; Mark Alan Jones, New Providence; Inderpal Singh Mumick, Berkeley Heights; Euthimios Panagos, New Providence; Divesh Srivastava, Summit, all of N.J.

[73] Assignee: AT&T Corp., New York, N.Y.

[21] Appl. No.: 09/002,885

[22] Filed: Jan. 5, 1998

[51] Int. Cl.[7] ........................................ G06F 17/60
[52] U.S. Cl. .................. 705/400; 379/93.24; 705/32; 705/34
[58] Field of Search .................. 340/825.44; 379/93.24; 705/32, 34, 400; 709/206, 217

[56] References Cited

U.S. PATENT DOCUMENTS

| | | | |
|---|---|---|---|
| 5,508,817 | 4/1996 | Kunigami | 358/402 |
| 5,675,507 | 10/1997 | Bobo, II | 709/206 |
| 5,768,521 | 6/1998 | Dedrick | 709/224 |
| 5,771,289 | 6/1998 | Kuzma | 380/23 |
| 5,870,549 | 2/1999 | Bob, II | 709/206 |

*Primary Examiner*—Edward R. Cosimano
*Attorney, Agent, or Firm*—Morgan & Finnegan, LLP

[57] ABSTRACT

The present invention is a messaging system, and method of operation thereof, which provides message recipients with control over the delivery of message and charges the cost of a message to the sender of the message. A message is received at a messaging server from a sender system, the message including an indication of a recipient system. A notification message is transmitted to the recipient system, allowing the message recipient to determine whether they desire the message to be delivered. If so, an activation message is received from the recipient system and the message is transmitted to the recipient system. A charge for the message is assessed to the sender of the message. The message is stored in the messaging server until the activation message is received. At least a portion of the assessed charge may be credited or debited to the recipient of the message. The message may include any type of electronic information, such as text, graphics, video and audio information, and may be encrypted or unencrypted.

27 Claims, 4 Drawing Sheets

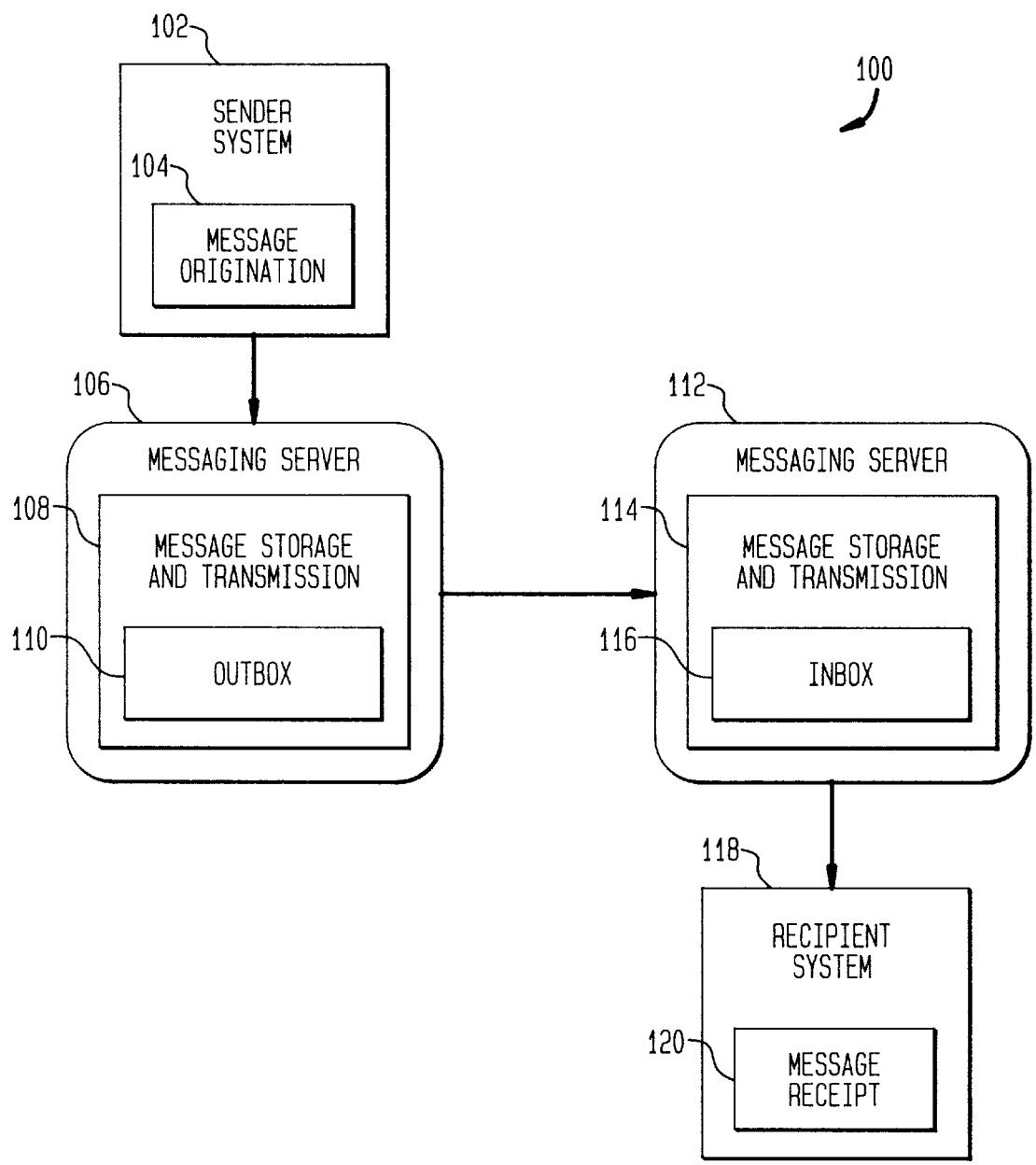

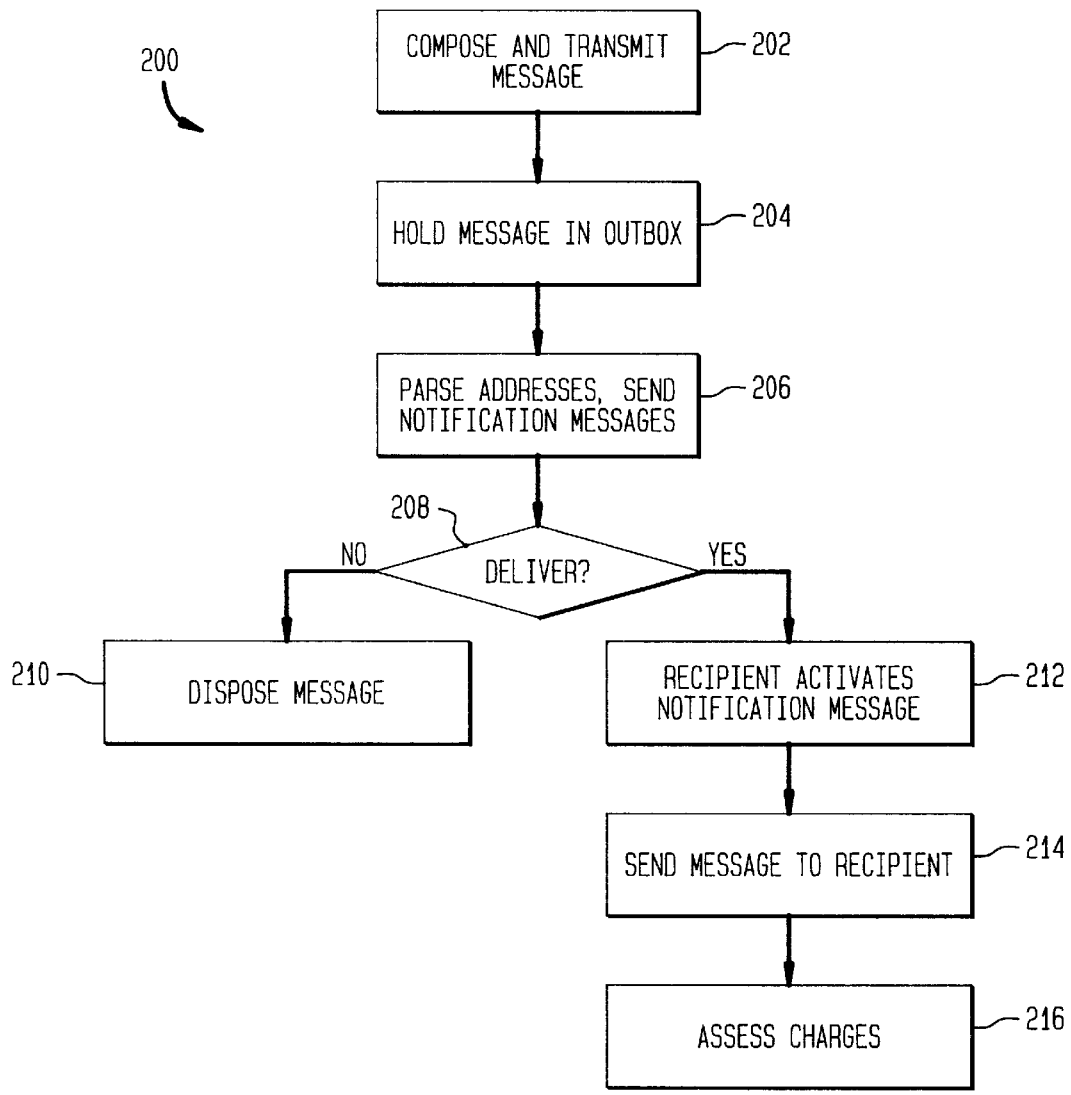

SENDER-PAID ELECTRONIC MESSAGING

FIELD OF THE INVENTION

The present invention relates to a system and method for handling messaging charges.

BACKGROUND OF THE INVENTION

In a conventional electronic messaging system, a message is originated by a sender and delivered to one or more recipients. Delivery is effected by physically transporting the message from the sender to the messaging server that services the recipient. The message recipient pays a fee for such service to the provider of the messaging server. As server storage is limited, server providers impose a limit on the amount of message storage each customer can use for storing incoming messages. In this arrangement, the message recipient bears the cost of messaging. By contrast, the sender can send as many messages as desired without significant charge. A need arises for a messaging system in which a message sender bears the cost of sending an electronic message.

SUMMARY OF THE INVENTION

The present invention is a messaging system, and method of operation thereof, which provides message recipients with control over the delivery of message and charges the cost of a message to the sender of the message.

According to the present invention a message is received at a messaging server from a sender system, the message including an indication of a recipient system A notification message is transmitted to the recipient system, allowing the message recipient to determine whether they desire the message to be delivered. If so, an activation message is received from the recipient system and the message is transmitted to the recipient system. A charge for the message is assessed to the sender of the message. The message is stored in the messaging server until the activation message is received, the message is deleted by the sender, or the message expires.

In one embodiment of the present invention, at least a portion of the assessed charge is credited or debited to the recipient of the message.

The message may include any type of electronic information, such as text, graphics, video and audio information, and may be encrypted or unencrypted.

BRIEF DESCRIPTION OF THE DRAWINGS

The details of the present invention, both as to its structure and operation, can best be understood by referring to the accompanying drawings, in which like reference numbers and designations refer to like elements.

FIG. 1 is a block diagram of a messaging system, according to the present invention.

FIG. 2a is a flow diagram of one embodiment of a messaging process, implemented in the system of FIG. 1.

FIG. 2b is a dataflow diagram of the messaging process shown in FIG. 2a.

DETAILED DESCRIPTION OF THE INVENTION

Figure 2B:
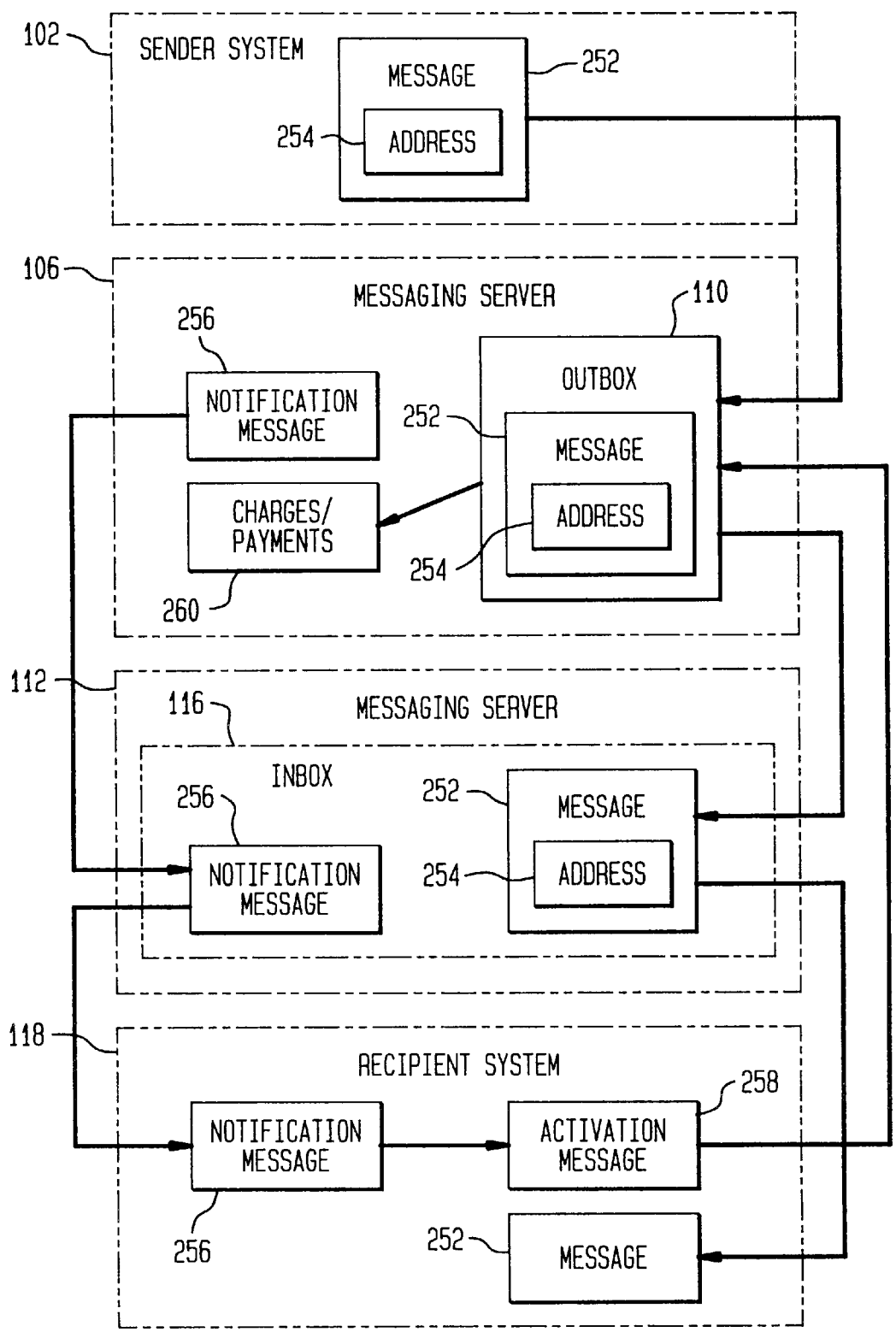

A messaging system 100, according to one embodiment of the present invention, is shown in FIG. 1. A user desiring to send a message operates sender system 102, which includes message origination block 104. Sender system 102 is typically a computer system, such as a personal computer or workstation, but may also be a minicomputer or mainframe, or a device such as a fax machine, telephone, etc. The present invention is applicable to any electronic message type, such as voice messages, FAX messages, etc. For clarity, only one sender system is shown, which is representative of a plurality of sender systems. Message origination block 104 allows the creation and transmission of messages and is typically software running on sender system 102, although hardware components may be utilized instead or in addition. Sender system 102 is communicatively connected to messaging server 106 over a communication network. The communication network depends on the implementation and may include any well-known network, such as the Internet, a private local or wide-area network, the public switched telephone network, a wireless network, etc.

Messaging server 106 includes message storage and transmission block 108. Message storage and transmission block 108 is typically a combination of hardware and software, which receives messages, stores the received messages, resolves the recipient addresses of the messages and transmits the messages to the addressed recipients. Message storage and transmission block 108 includes outbox 110, in which outgoing messages from sender system 102 are stored until they can be further transmitted.

Messaging server 106 is typically communicatively connected to one or more other messaging servers, such as messaging server 112, using any well known communication network. For clarity, only one additional messaging server is shown, which is representative of a plurality of additional messaging servers. Messaging server 112 includes message storage and transmission block 114. Message storage and transmission block 114 includes inbox 116, in which incoming messages received from messaging server 106 are stored until they can be transmitted to a recipient system, such as system 118.

Messaging server 112 is communicatively connected to one or more recipient systems, such as system 118, using any well-known communication network. For clarity, only one recipient system is shown, which is representative of a plurality of recipient systems. Each recipient system, such as system 112, is typically a computer system, such as a personal computer or workstation, but may also be a minicomputer or mainframe, or a device such as a fax machine, telephone, etc. Recipient system 118 includes message receipt block 120, which receives incoming messages and allows them to be presented to the message recipient. The term presented is used herein to denote any and all techniques by which a message may be delivered to the message recipient.

How a message is presented depends upon the type of the message. For example, presentation of text or fax messages typically requires the display of text or graphics, while presentation of a video or audio message may require display of full-motion video and coordinated sound, etc. Typically, message receipt block 114 is software running on recipient system 118, but hardware, such as video decoders, sound cards, etc., may be required, depending upon the types of messages that are supported.

Alternatively, messaging server 106 may be communicatively connected to recipient system 118 in a arrangement that does not include messaging server 112. In this embodiment, inbox 116 may reside on messaging server 106, or inbox 116 may reside directly on recipient system 118. The present invention includes any arrangement of messaging servers, outboxes, inboxes and recipient systems. Any implementation changes that are necessitated by such variations would be apparent to one of skill in the art.

Although, in FIG. 1, system 102 is designated a sender system and system 118 is designated a recipient system, these designations are functional only. In fact, both sender and recipient systems are typically similar devices and are capable of performing both sender and recipient functions. Likewise, both messaging server 106 and messaging server 112 are typically capable of performing messaging functions for both senders and recipients of messages. Thus, both messaging servers typically include an inbox and an outbox.

Turning now to FIG. 2a, a messaging process 200, according to the present invention, is shown. It is best viewed in conjunction with FIG. 2b, which shows the dataflow in the system of FIG. 1. The process begins with step 202, in which a user, who desires to send a message, composes the message 252, which may be email, voice, video, fax, etc., on sender system 102. The message and the intended recipient or recipients are entered using message origination block 104. The intended recipients are specified by address information 254 included with the message. For example, in the case of an email message, the email addresses of the intended recipients are listed in a "TO:" block at the head of the message. Other types of messages may use other addressing techniques, but all include some address information identifying the intended recipients. The message and address information are then transmitted to messaging server 106.

In step 204, message 252, including address information 254, is received at messaging server 106, where it is received and stored in outbox 110 by message storage and transmission block 108. In step 206, the recipient systems to which the message is addressed are identified by referring to address information 254. A notification message 256 is sent to each recipient system. Although, for clarity, only one recipient system 118 is shown in this example, the message may be sent to multiple recipients. The notification message 256 includes information about message 252, such as the sender of the message, the type of the message, the size of the message, etc. In the embodiment of FIG. 1, notification message 256 is transmitted from messaging server 106 to messaging server 112, where it is held in inbox 116 until delivered to recipient system 118. In alternative embodiments, notification message 256 may instead be transmitted directly from messaging server 106 to recipient system 118. In step 208, the message recipient determines whether they desire message to be delivered 252. If the message recipient does not desire message delivery, the recipient may simply ignore the notification message, in which case, in step 210, message 252 will be disposed when the message expires. The message will expire after a pre-determined time has elapsed. Alternatively, the recipient may delete the notification message. Likewise, if the message has not yet been delivered, the sender may cancel delivery of the message, which causes the message to be deleted.

If the message recipient does desire the message to be delivered, then in step 212, the recipient activates the notification message. Activation of the notification message causes, in step 214, an activation message 258 to be transmitted to messaging server 106, either directly, as shown, or through messaging server 112. Upon receiving the activation message, messaging server 112 transmits message 252 to recipient system 118, either directly, or through messaging server 112, as shown. In addition, in step 216, messaging server 106 assesses message delivery charges 260 to the sender of the message, using well known billing techniques.

Typically, message delivery charges 260 are assessed to the sender of the message and credited to the messaging server provider. However, other embodiments are possible. For example, all or a portion of the message delivery charges that are assessed may be credited to the recipient of the message. This would be useful, for example, in advertising, to induce message recipients to accept delivery of advertising messages. Likewise, all or a portion of the message delivery charges that are assessed may be debited to the recipient of the message.

Figure 3:
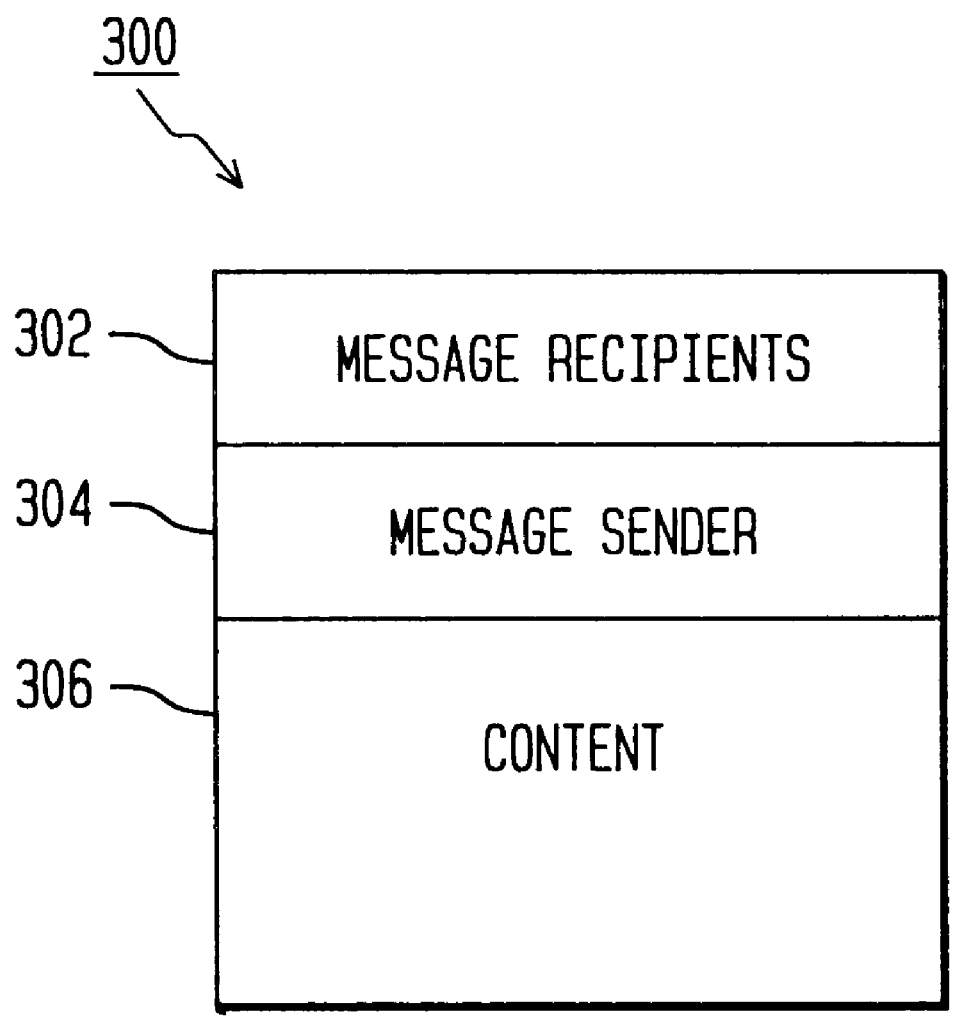
FIG. 3 is an exemplary message format, according to the present invention.

An exemplary message 300, according to one embodiment of the present invention, is shown in FIG. 3. Message 300 includes a message recipient field 302, message sender field 304, and content field 306. Message recipient field 302 and message sender field 304 typically contain messaging addresses which indicate the recipients and the sender, respectively, of the message. Messaging addresses relating to any type of message may be used, such as email addresses, voice mail mailboxes, telephone numbers, etc. Content field 306 contains the message content. The message content may be of any type, such as text, fax, audio, video, etc., and may be encrypted or unencrypted.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A messaging server coupled to a sender system and a recipient system, the messaging server comprising:

means for receiving a message from a sender system, the message including an indication of a recipient system;

means for transmitting a notification message to the recipient system;

means for receiving an activation message from the recipient system;

means for transmitting the message to the recipient system; and means for assessing a charge to a sender of the message.

2. The system of claim 1, further comprising means for storing the message until the activation message is received.

3. The system of claim 1, further comprising means for crediting or debiting at least a portion of the assessed charge to a recipient of the message.

4. The system of claim 1, wherein the message includes encrypted information.

5. The system of claim 1, wherein the message includes unencrypted information.

6. The system of claim 1, wherein the message includes text information.

7. The system of claim 1, wherein the message includes graphics information.

8. The system of claim 1, wherein the message includes video information.

9. The system of claim 1, wherein the message includes audio information.

10. A method of messaging comprising the steps of:

receiving a message from a sender system, the message including an indication of a recipient system;

transmitting a notification message to the recipient system;

receiving an activation message from the recipient system;

transmitting the message to the recipient system; and assessing a charge to a sender of the message.

11. The method of claim 10, further comprising the step of:

storing the message until the activation message is received.

12. The method of claim 10, further comprising the step of:

crediting or debiting at least a portion of the assessed charge to a recipient of the message.

13. The method of claim 10, wherein the message includes encrypted information.

14. The method of claim 10, wherein the message includes unencrypted information.

15. The method of claim 10, wherein the message includes text information.

16. The method of claim 10, wherein the message includes graphics information.

17. The method of claim 10, wherein the message includes video information.

18. The method of claim 10, wherein the message includes audio information.

19. A messaging system comprising:

a sender system;

a recipient system; and a messaging server coupling the sender system to the recipient system, wherein the messaging server is operable to:

receive a message from the sender system, the message including an indication of the recipient system;

transmit a notification message to the recipient system;

receive an activation message from the recipient system;

transmit the message to the recipient system; and assess a charge to a sender of the message.

20. The system of claim 19, wherein the messaging server is further operable to store the message until the activation message is received.

21. The system of claim 19, wherein the messaging server is further operable to credit or debit at least a portion of the assessed charge to a recipient of the message.

22. The system of claim 19, wherein the message includes encrypted information.

23. The system of claim 19, wherein the message includes unencrypted information.

24. The system of claim 19, wherein the message includes text information.

25. The system of claim 19, wherein the message includes graphics information.

26. The system of claim 19, wherein the message includes video information.

27. The system of claim 19, wherein the message includes audio information.

* * * * *